United States Patent
Li et al.

(10) Patent No.: US 10,070,380 B2
(45) Date of Patent: Sep. 4, 2018

(54) CELL ACCESS METHOD AND CELL ACCESS APPARATUS

(71) Applicant: CHINA ACADEMY OF TELECOMMUNICATION TECHNOLOGY, Beijing (CN)

(72) Inventors: Hui Li, Beijing (CN); Qiubin Gao, Beijing (CN); Runhua Chen, Beijing (CN); Rakesh Tamrakar, Beijing (CN)

(73) Assignee: China Academy Of Telecommunications Technology, Beijing (CN)

(*) Notice: Subject to any disclaimer, the term of this patent is extended or adjusted under 35 U.S.C. 154(b) by 0 days.

(21) Appl. No.: 15/514,485

(22) PCT Filed: Sep. 10, 2015

(86) PCT No.: PCT/CN2015/089336
§ 371 (c)(1),
(2) Date: Mar. 24, 2017

(87) PCT Pub. No.: WO2016/045509
PCT Pub. Date: Mar. 31, 2016

(65) Prior Publication Data
US 2017/0303191 A1    Oct. 19, 2017

(30) Foreign Application Priority Data

Sep. 26, 2014 (CN) .......................... 2014 1 0505587

(51) Int. Cl.
*H04W 4/00* (2018.01)
*H04W 48/20* (2009.01)
(Continued)

(52) U.S. Cl.
CPC ........... *H04W 48/20* (2013.01); *H04W 48/10* (2013.01); *H04B 7/0452* (2013.01)

(58) Field of Classification Search
CPC .... H04B 7/0617; H04B 7/0634; H04W 16/28
(Continued)

(56) References Cited

U.S. PATENT DOCUMENTS

2007/0249402 A1    10/2007  Dong et al.
2010/0061360 A1    3/2010  Chen et al.
(Continued)

FOREIGN PATENT DOCUMENTS

CN    101686080 A    3/2010
CN    101938302 A    1/2011
(Continued)

OTHER PUBLICATIONS

International Search Report for PCT/CN2015/089336 dated May 24, 2015 and its English translation provided by WIPO.
(Continued)

*Primary Examiner* — Kiet Doan
(74) *Attorney, Agent, or Firm* — Ladas & Parry, LLP (57) ABSTRACT

A cell access method and a cell access apparatus are provided. The cell access method includes steps of: measuring pilot signals for each of multiple cells that have been searched out, the pilot signals transmitted on a pilot resource for each cell being beam-formed using a set of beam-forming vectors configured for the cell; and selecting a cell corresponding to an optimum pilot signal measurement result from the multiple cells that have been searched and accessing the selected cell.

14 Claims, 4 Drawing Sheets

(51) Int. Cl.
*H04W 48/10* (2009.01)
*H04B 7/0452* (2017.01)

(58) Field of Classification Search
USPC ....... 455/456.1, 434, 17, 448; 370/329, 332, 370/252, 328, 267
See application file for complete search history.

(56) References Cited

U.S. PATENT DOCUMENTS

| | | | | |
|---|---|---|---|---|
| 2011/0070822 | A1* | 3/2011 | Schlee | H04B 7/0452 455/17 |
| 2011/0305293 | A1* | 12/2011 | Choi | H04W 72/082 375/285 |
| 2012/0127932 | A1* | 5/2012 | Gao | H04L 5/0035 370/329 |
| 2013/0321207 | A1* | 12/2013 | Monogioudis | H01Q 1/246 342/373 |
| 2015/0004970 | A1* | 1/2015 | Venkatachari | H04W 36/0055 455/434 |
| 2015/0289155 | A1 | 10/2015 | Gao | |

FOREIGN PATENT DOCUMENTS

| | | |
|---|---|---|
| CN | 103840907 A | 6/2014 |
| EP | 1507427 A1 | 2/2005 |
| WO | 2013/137794 A1 | 9/2013 |
| WO | 2014/116928 A1 | 7/2014 |
| WO | 2014/117352 A1 | 8/2014 |

OTHER PUBLICATIONS

Written Opinion of the International Search Authority for PCT/CN2015/089336 dated May 24, 2015 and its English translation provided by WIPO.
International Preliminary Report on Patentability (IPRP) Ch. 1 for PCT/CN2015/089336 dated Mar. 28, 2017 and its English translation provided by WIPO.
From EPO Application No. EP 15843678.2, Supplementary Search Report and Opinion dated Aug. 3, 2017.

* cited by examiner

CELL ACCESS METHOD AND CELL ACCESS APPARATUS

CROSS-REFERENCE TO RELATED APPLICATIONS

The present application is a national phase of PCT Application No. PCT/CN2015/089336 filed on Sep. 10, 2015, which claims priority to Chinese patent application No. 201410505587.1 filed on Sep. 26, 2014, the disclosures of which are incorporated herein by reference.

TECHNICAL FIELD

The present disclosure relates to the field of communications technology, in particular to a cell access method and a cell access apparatus.

BACKGROUND

For Long Term Evolution (LTE) system, cell search is performed as described hereinafter. At first, 5-ms slot synchronization is achieved based on a Primary Synchronization Signal (PSS), and then frame synchronization is achieved and cell identities (cell IDs) are acquired based on a Secondary Synchronization Signal (SSS). With the above-mentioned synchronization procedure, it is able to acquire a Cell-specific Reference signal (CRS) for each cell. The CRS may be used to, on one hand, perform channel estimation and channel demodulation, and on the other hand, perform cell measurement. In the case that a User Equipment (UE) is to access a cell, it may perform cell measurement for multiple cells to measure Reference Signal Received Power (RSRP) of the CRS for each cell, and select the cell corresponding to the optimum RSRP to access.

In a process that the UE accesses the cell in related technologies, it is unable to adjust a beam direction of the CRS, and the beam direction of the CRS based on which the UE performs measurement may not be directed toward the UE. Hence, the UE may probably access a cell not orientated toward the UE. As a result, an access effect of the UE is not so good, and thereby adversely affecting the system performance.

SUMMARY

A consideration of the present disclosure is to provide a cell access method and a cell access apparatus, so as to improve the access effect of the UE as well as not adversely affect the system performance.

In one aspect, the present disclosure provides in some embodiments a cell access method, including steps of: measuring pilot signals for each of multiple cells that have been searched out, the pilot signals transmitted on a pilot resource for each cell being beam-formed using a set of beam-forming vectors configured for the cell; and selecting a cell corresponding to an optimum pilot signal measurement result from the multiple cells that have been searched out and accessing the selected cell.

In a possible embodiment of the present disclosure, prior to the step of measuring the pilot signals for each of the multiple cells that have been searched out, the cell access method further includes: acquiring configuration information of the pilot resource for each of the multiple cells that have been searched out; and determining the pilot resource where the pilot signals for each of the multiple cells are located, based on the acquired configuration information of the pilot resource. The step of measuring the pilot signals for each of the multiple cells that have been searched out includes: measuring, on the pilot resource where the pilot signals for each of the multiple cells that have been searched out are located, the pilot signals for each of the multiple cells that have been searched out.

In a possible embodiment of the present disclosure, the step of acquiring the configuration information of the pilot resource for each of the multiple cells that have been searched out includes: receiving a broadcast message sent by each of the multiple cells that have been searched out, the broadcast message sent by each cell carrying the configuration information of the pilot resource for the cell; and acquiring the configuration information of the pilot resource for each of the multiple cells that have been searched out from the received broadcast message.

In a possible embodiment of the present disclosure, the step of acquiring the configuration information of the pilot resource for each of the multiple cells that have been searched out includes: receiving a broadcast message of at least one cell that have been searched out, the broadcast message of each cell carrying the configuration information of the pilot resource for the cell and the configuration information of the pilot resource for a neighboring cell; acquiring the configuration information of the pilot resource for the cell of which the broadcast message has been received; and acquiring the configuration information of the pilot resource for a cell that have been searched out and of which no broadcast message has been received, based on the configuration information of the pilot resource for the neighboring cell carried in the received broadcast message.

In a possible of the present disclosure, the step of acquiring the configuration information of the pilot resource for each of the multiple cells that have been searched out includes: receiving a broadcast message of at least one cell that have been searched out, the broadcast message from each cell carrying the configuration information of the pilot resource for the cell; acquiring the configuration information of the pilot resource for the cell of which the broadcast message has been received; and determining a neighboring relation between a cell that have been searched out and of which no broadcast message has been received and the cell of which the broadcast message has been received, and determining the configuration information of the pilot resource for the cell that have been searched out and of which no broadcast message has been received, based on the configuration information of the pilot resource for the cell of which the broadcast message has been received and the neighboring relation. Neighboring cells have an identical quantity of the pilot resource, an identity quantity of pilot resource ports and an identical configuration period.

In a possible embodiment of the present disclosure, the step of acquiring the configuration information of the pilot resource for each of the multiple cells that have been searched out includes: acquiring the configuration information of the pilot resource for each of the multiple cells that have been searched out based on a correspondence between identity information of each cell and configuration information of the pilot signals for each cell.

Optionally, on the basis of each above embodiment, the pilot signals on different pilot resources for an identical cell are beam-formed using different beam-forming vectors, the cell is provided with N pilot resources each having M ports, where N equals to the quantity of the beam-forming vectors configured for the cell, and each of N and M is an integer not smaller than 1.

Optionally, on the basis of each above embodiment, the pilot signals on different ports of each pilot resource for a cell are beam-formed using different beam-forming vectors, the cell is provided with at least one N-port pilot resource, where N equals to the quantity of the beam-forming vectors configured for the cell, and N is an integer not smaller than 1.

In another aspect, the present disclosure provides in some embodiments a cell access method, including steps of: beam-forming pilot signals for a cell using a set of beam-forming vectors configured for the cell; and transmitting the beam-formed pilot signals on a pilot resource, to enable a User Equipment to measure the pilot signals for each of multiple cells that have been searched out, select, based on measurement results of the pilot signals for the cells that have been searched out, a cell from the multiple cells that have been searched out, and access the selected cell.

In a possible embodiment of the present disclosure, the cell access method further includes transmitting configuration information of the pilot resource for the cell.

In a possible embodiment of the present disclosure, the step of transmitting the configuration information of the pilot resource for the cell includes transmitting a broadcast message that carries the configuration information of the pilot resource for the cell.

In a possible embodiment of the present disclosure, the broadcast message further carries configuration information of a pilot resource for a neighboring cell.

Optionally, on the basis of each above embodiment, the step of beam-forming the pilot signals for the cell using the set of beam-forming vectors configured for the cell includes: beam-forming the pilot signals on different pilot resources for the cell using different beam-forming vectors, where the cell is provided with N pilot resources each having M ports, where N equals to the quantity of the beam-forming vectors configured for the cell, and each of N and M is an integer not smaller than 1.

Optionally, on the basis of each above embodiment, the step of beam-forming the pilot signals for the cell using the set of beam-forming vectors configured for the cell includes: beam-forming the pilot signals on different ports of each pilot resource for the cell using different beam-forming vectors, where the cell is provided with at least one N-port pilot resource, where N equals to the quantity of the beam-forming vectors configured for the cell, and N is an integer not smaller than 1.

In yet another aspect, the present disclosure provides in some embodiments a cell access apparatus, including: a pilot signal measurement module configured to measure pilot signals for each of multiple cells that have been searched out, the pilot signals transmitted on a pilot resource for each cell being beam-formed using a set of beam-forming vectors configured for the cell; and a cell access module configured to select a cell corresponding to an optimum pilot signal measurement result from the multiple cells that have been searched out and access the selected cell.

In a possible embodiment of the present disclosure, the cell access apparatus further includes a pilot configuration acquisition module configured to acquire configuration information of the pilot resource for each of the multiple cells that have been searched out, and a pilot resource determination module configured to determine the pilot resource where the pilot signals for each of the multiple cells are located, based on the acquired configuration information of the pilot resource. The pilot signal measurement module is further configured to measure, on the pilot resource where the pilot signals for each of the multiple cells that have been searched out are located, the pilot signals for each of the multiple cells that have been searched out.

In a possible embodiment of the present disclosure, the pilot configuration acquisition module is further configured to receive a broadcast message sent by each of the multiple cells that have been searched out, the broadcast message sent by each cell carrying the configuration information of the pilot resource for the cell, and acquire the configuration information of the pilot resource for each of the multiple cells that have been searched out from the received broadcast message.

In a possible embodiment of the present disclosure, the pilot configuration acquisition module is further configured to: receive a broadcast message of at least one cell that have been searched out, the broadcast message of each cell carrying the configuration information of the pilot resource for the cell and the configuration information of the pilot resource for a neighboring cell; acquire the configuration information of the pilot resource for the cell of which the broadcast message has been received; and acquire the configuration information of the pilot resource for a cell that have been searched out and of which no broadcast message has been received, based on the configuration information of the pilot resource for the neighboring cell carried in the received broadcast message.

In a possible embodiment of the present disclosure, the pilot configuration acquisition module is further configured to: receive a broadcast message of at least one cell that have been searched out, the broadcast message of each cell carrying the configuration information of the pilot resource for the cell; acquire the configuration information of the pilot resource for the cell of which the broadcast message has been received; and determine a neighboring relation between a cell that have been searched out and of which no broadcast message has been received and the cell of which the broadcast message has been received, and determine the configuration information of the pilot resource for the cell that have been searched out and of which no broadcast message has been received, based on the configuration information of the pilot resource for the cell of which the broadcast message has been received and the neighboring relation, where neighboring cells have an identical quantity of the pilot resource, an identical quantity of pilot resource ports and an identical configuration period.

In a possible embodiment of the present disclosure, the pilot configuration acquisition module is further configured to acquire the configuration information of the pilot resource for each of the multiple cells that have been searched out, based on a correspondence between identity information of each cell and configuration information of the pilot signals for each cell.

Optionally, on the basis of each above embodiment, the pilot signals on different pilot resources for an identical cell are beam-formed using different beam-forming vectors, the cell is provided with N pilot resources each having M ports, where N equals to the quantity of the beam-forming vectors configured for the cell, and each of N and M is an integer not smaller than 1.

Optionally, on the basis of each above embodiment, the pilot signals on different ports of each pilot resource for a cell are beam-formed using different beam-forming vectors, the cell is provided with at least one N-port pilot resource, where N equals to the quantity of the beam-forming vectors configured for the cell, and N is an integer not smaller than 1.

In still yet another aspect, the present disclosure provides in some embodiments a UE, including a processor, a memory and a transceiver. The processor is configured to read a program stored in the memory, so as to: measure pilot signals for each of multiple cells that have been searched out, the pilot signals transmitted on a pilot resource for each cell being beam-formed using a set of beam-forming vectors configured for the cell; and select a cell corresponding to an optimum pilot signal measurement result from the multiple cells that have been searched out and access the selected cell. The transceiver is configured to receive and transmit data under the control of the processor. The memory is configured to store therein data to be used in operation of the processor.

In a possible embodiment of the present disclosure, the processor is further configured to read the program stored in the memory to: acquire configuration information of the pilot resource for each of the multiple cells that have been searched out; determine the pilot resource where the pilot signals for each of the multiple cells are located, based on the acquired configuration information of the pilot resource; and measure, on the pilot resource where the pilot signals for each of the multiple cells that have been searched out are located, the pilot signals for each of the multiple cells that have been searched out.

In a possible embodiment of the present disclosure, the processor is further configured to read the program stored in the memory to: receive a broadcast message sent by each of the multiple cells that have been searched out, the broadcast message sent by each cell carrying the configuration information of the pilot resource for the cell; and acquire the configuration information of the pilot resource for each of the multiple cells that have been searched out from the received broadcast message.

In a possible embodiment of the present disclosure, the processor is further configured to read the program stored in the memory to: receive a broadcast message of at least one cell that has been searched out, the broadcast message of each cell carrying the configuration information of the pilot resource for the cell and the configuration information of the pilot resource for a neighboring cell; acquire the configuration information of the pilot resource for the cell of which the broadcast message has been received; and acquire the configuration information of the pilot resource for a cell that has been searched out and of which no broadcast message has been received, based on the configuration information of the pilot resource for the neighboring cell carried in the received broadcast message.

In a possible embodiment of the present disclosure, the processor is further configured to read the program stored in the memory to: receive a broadcast message of at least one cell that has been searched out, the broadcast message of each cell carrying the configuration information of the pilot resource for the cell; acquire the configuration information of the pilot resource for the cell of which the broadcast message has been received; and determine a neighboring relation between a cell that has been searched out and of which no broadcast message has been received and the cell of which the broadcast message has been received, and determine the configuration information of the pilot resource for the cell that has been searched out and of which no broadcast message has been received, based on the configuration information of the pilot resource for the cell of which the broadcast message has been received and the neighboring relation, where neighboring cells have an identical quantity of the pilot resource, an identical quantity of pilot resource ports and an identical configuration period.

In a possible embodiment of the present disclosure, the processor is further configured to read the program stored in the memory to: acquire the configuration information of the pilot resource for each of the multiple cells that have been searched out, based on a correspondence between identity information of each cell and configuration information of the pilot signals for each cell.

Optionally, on the basis of any above UE, the pilot signals on different pilot resources for an identical cell are beam-formed using different beam-forming vectors, the cell is provided with N pilot resources each having M ports, where N equals to the quantity of the beam-forming vectors configured for the cell, and each of N and M is an integer not smaller than 1.

Optionally, on the basis of any above UE, the pilot signals on different ports of each pilot resource for a cell are beam-formed using different beam-forming vectors, the cell is provided with at least one N-port pilot resource, where N equals to the quantity of the beam-forming vectors configured for the cell, and N is an integer not smaller than 1.

In still yet another aspect, the present disclosure provides in some embodiments a cell access apparatus, including: a beam-forming module configured to beam-form pilot signals for a cell using a set of beam-forming vectors configured for the cell; and a pilot signal transmission module configured to transmit the beam-formed pilot signals on a pilot resource, to enable a User Equipment to measure the pilot signals for each of multiple cells that have been searched out, select, based on measurement results of the pilot signals for the cells that have been searched out, a cell from the multiple cells that have been searched out, and access the selected cell.

In a possible embodiment of the present disclosure, the cell access apparatus further includes a pilot configuration transmission module configured to transmit configuration information of the pilot resource for the cell.

In a possible embodiment of the present disclosure, the pilot configuration transmission module is further configured to transmit a broadcast message that carries the configuration information of the pilot resource for the cell.

In a possible embodiment of the present disclosure, the broadcast message further carries configuration information of a pilot resource for a neighboring cell.

Optionally, on the basis of each above embodiment, the beam-forming module is further configured to beam-form the pilot signals on different pilot resources for the cell using different beam-forming vectors, and the cell is provided with N pilot resources each having M ports, where N equals to the quantity of the beam-forming vectors configured for the cell, and each of N and M is an integer not smaller than 1.

Optionally, on the basis of each above embodiment, the beam-forming module is further configured to beam-form the pilot signals on different ports of each pilot resource for the cell using different beam-forming vectors, and the cell is provided with at least one N-port pilot resource, where N equals to the quantity of the beam-forming vectors configured for the cell, and N is an integer not smaller than 1.

In still yet another aspect, the present disclosure provides in some embodiments a base station, including a processor, a memory and a transceiver. The processor is configured to read a program stored in the memory to: beam-form pilot signals for a cell using a set of beam-forming vectors configured for the cell; and transmit the beam-formed pilot signals on a pilot resource, to enable a User Equipment to measure the pilot signals for each of multiple cells that have been searched out, select, based on measurement results of the pilot signals for the cells that have been searched out, a cell from the multiple cells that have been searched out, and access the selected cell. The transceiver is configured to receive and transmit data under the control of the processor. The memory is configured to store therein data to be used in operation of the processor.

In a possible embodiment of the present disclosure, the processor is further configured to read the program stored in the memory to transmit configuration information of the pilot resource for the cell.

In a possible embodiment of the present disclosure, the processor is further configured to read the program stored in the memory to transmit a broadcast message that carries the configuration information of the pilot resource for the cell.

In a possible embodiment of the present disclosure, the broadcast message further carries configuration information of a pilot resource for a neighboring cell.

Optionally, on the basis of any above base station, the processor is further configured to read the program stored in the memory to beam-form the pilot signals on different pilot resources for the cell using different beam-forming vectors, and the cell is provided with N pilot resources each having M ports, where N equals to the quantity of the beam-forming vectors configured for the cell, and each of N and M is an integer not smaller than 1.

Optionally, on the basis of any above base station, the processor is further configured to read the program stored in the memory to beam-form the pilot signals on different ports of each pilot resource for the cell using different beam-forming vectors, and the cell is provided with at least one N-port pilot resource, where N equals to the quantity of the beam-forming vectors configured for the cell, and N is an integer not smaller than 1.

the pilot signals for each cell may be beam-formed at a network side using a set of beam-forming vectors, so as to transmit beams respectively carrying the pilot signals in various directions. When a UE attempts to access a cell, the UE may measure the beam-formed pilot signals, and the closer the beam direction pointing to the UE, the better a measurement result of the pilot signal carried on the beam. Hence, with the cell access apparatus provided in the present disclosure, the cell corresponding to the optimum pilot signal measurement result selected by the UE is just a cell corresponding to a beam having a closest direction pointing to the UE. As a result, compared with the related technologies, it is able to improve an access effect of the UE with the present disclosure, thereby improving the system performance.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

The present disclosure is described in detail based on embodiments in conjunction with the drawings, while the embodiments are intended to explain rather than to limit the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Technical solutions according to embodiments of the present disclosure will be described hereinafter in a clear and complete manner in conjunction with the drawings. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
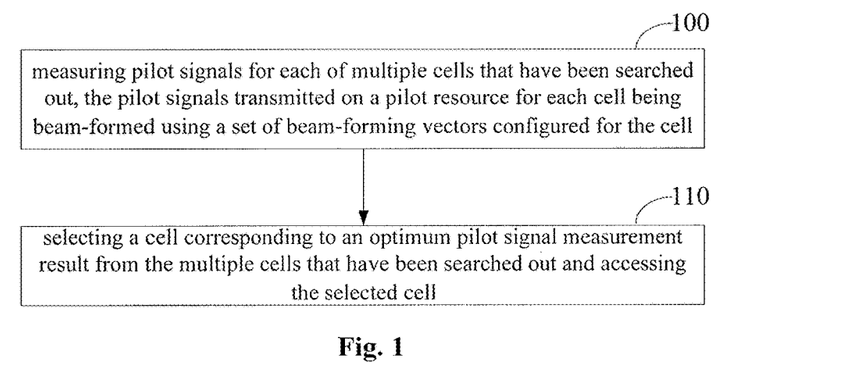
FIG. 1 is a flow chart of a cell access method at a UE side according to some embodiments of the present disclosure.

The present disclosure provides in some embodiments a cell access method at a UE side which, as shown in FIG. 1, includes: Step 100 of measuring pilot signals for each of multiple cells that have been searched out, the pilot signals transmitted on a pilot resource for each cell being beam-formed using a set of beam-forming vectors configured for the cell; and Step 110 of selecting a cell corresponding to an optimum pilot signal measurement result from the multiple cells that have been searched out and accessing the selected cell.

In some embodiments of the present disclosure, the pilot signal measurement result may include, but is not limited to, RSRP of the pilot signal and Reference Signal Received Quality (RSRQ) of the pilot signal.

According to the embodiments of the present disclosure, the pilot signals transmitted on the pilot resource for each cell may be beam-formed at the network side using a set of beam-forming vectors, so as to transmit beams respectively carrying the pilot signals in various directions. When a UE attempts to access a cell, the UE may measure the beam-formed pilot signals, and the closer the beam direction pointing to the UE, the better a measurement result of the pilot signal carried on the beam. Hence, with the cell access method provided in the present disclosure, the cell corresponding to the optimum pilot signal measurement result selected by the UE is just a cell corresponding to a beam having a closest direction pointing to the UE. As a result, compared with the related technologies, it is able to improve an access effect of the UE with the present disclosure, thereby improving the system performance.

The measurement results of the pilot signals for the cells may be compared in various ways. Based on the above processing, it is able for a person skilled in the art, without any creative effort, to compare the measurement results.

In the embodiments of the present disclosure, the pilot signal may include, but is not limited to, CRS and Channel State Information-Reference Signal (CSI-RS).

In the case that the pilot signal is the CRS or any other pilot signal detectable in a blind detection manner, in Step 100, CRSs for each of the cells that have been searched out may be measured in a blind detection manner.

In the case that the pilot signal is the CSI-RS or any other pilot signal not detectable in a blind detection manner, configuration information of the pilot resource for each of the cells that have been searched out may be acquired, the pilot resource where the pilot signals for each of the cells are located may be determined based on the acquired configuration information of the pilot resource, and then the pilot signals for each of the cells that have been searched out may be measured on the determined pilot resource. To be specific, the pilot signals may be received at the pilot resource and then measured on the pilot resource.

The configuration information of the pilot resource may at least include a position of the pilot resource where the pilot signals are located, and may further include a scrambling sequence for the pilot signal.

In some embodiments of the present disclosure, the configuration information of the pilot resource may be transmitted via a broadcast message, or a dedicated signaling, which is not limited herein.

In the case that the configuration information of the pilot resource is sent from the network side via the broadcast message, the configuration information of the pilot resource may be acquired in the following modes.

In a first mode, a broadcast message sent by each of the cells that have been searched out is received, the broadcast message sent by each cell carrying the configuration information of the pilot resource for the cell; and the configuration information of the pilot resource for each cell that has been searched out is acquired from the received broadcast message.

In a second mode, a broadcast message of at least one cell that has been searched out is received, the broadcast message of each cell carrying configuration information of a pilot resource for the cell and configuration information of a pilot resource for a neighboring cell; the configuration information of the pilot resource for the cell whose broadcast message has been received is acquired; and configuration information of a pilot resource for a cell that has been searched out and of which no broadcast message has been received is acquired based on the configuration information of the pilot resource for the neighboring cell carried in the received broadcast message.

Upon the receipt of a broadcast message of a cell i, configuration information of a pilot resource for the cell i and configuration information of a pilot resource for a neighboring cell of the cell i may be acquired from the broadcast message. The UE may not acquire configuration information of a pilot resource from the cell that has been searched out and that is a neighboring cell of the cell i.

When one cell has been searched out, identity (ID) information of the cell may be acquired. Hence, it is able to determine, based on the ID information of the cells, a neighboring cell that has been searched out and of which no broadcast message has been received; then, the configuration information of the pilot resource for the cell that has been searched out and of which no broadcast message has been received can be acquired from the configuration information of the pilot resource for the neighboring cell carried in the broadcast message.

In a third mode, a broadcast message of at least one cell that has been searched out is received, the broadcast message of each cell carrying configuration information of a pilot resource for the cell; the configuration information of the pilot resource for the cell whose broadcast message has been received is acquired; and a neighboring relation between a cell that has been searched out and of which no broadcast message has been received and the cell whose broadcast message has been received is determined, and configuration information of a pilot resource for the cell that has been searched out and of which no broadcast message has been received is determined based on the configuration information of the pilot resource for the cell whose broadcast message has been received and the neighboring relation. Neighboring cells have an identical quantity of pilot resource, an identical quantity of pilot resource ports and an identical configuration period.

Upon the receipt of a broadcast message of a cell i, configuration information of a pilot resource for the cell i may be acquired from the broadcast message. The UE may not acquire configuration information of a pilot resource for a cell that has been searched out and that is a neighboring cell of the cell i, and instead, the UE may determine, based on the configuration information of the pilot resource for the cell i, configuration information of a pilot resource for the cell that has been searched out and that is a neighboring cell of the cell i.

Once one cell has been searched, a list of neighboring cells to the cell may also be acquired. Hence, it is able to determine, by looking up the list of the neighboring cells, the neighboring relation between a cell that has been searched and of which no broadcast message has been received and the cell whose broadcast message has been received.

In a fourth mode, configuration information of pilot resources for respective cells that have been searched out may be acquired based on a correspondence between ID information of each cell and configuration information of the pilot signals for each cell.

In some embodiments of the present disclosure, the correspondence between the ID information of each cell and the configuration information of the pilot signals for each cell may be acquired from, but not limited to, the broadcast message.

In a possible embodiment of the present disclosure, the pilot signals on different pilot resources for an identical cell may be beam-formed using different beam-forming vectors, and the cell may be provided with N pilot resources each having M ports, where N is also the quantity of the beam-forming vectors configured for the cell, and each of N and M is an integer not smaller than 1.

In a possible embodiment of the present disclosure, the pilot signals on different ports of each pilot resource for a cell may be beam-formed using different beam-forming vectors, and the cell may be provided with at least one N-port pilot resource, where N is also the quantity of the beam-forming vectors configured for the cell, and N is an integer not smaller than 1.

A value of N may be determined in accordance with an actual application scenario, or may be specified in a protocol, which is not particularly defined herein. M may represent, but not limited to, the quantity of antenna ports of an antenna array.

Figure 2:
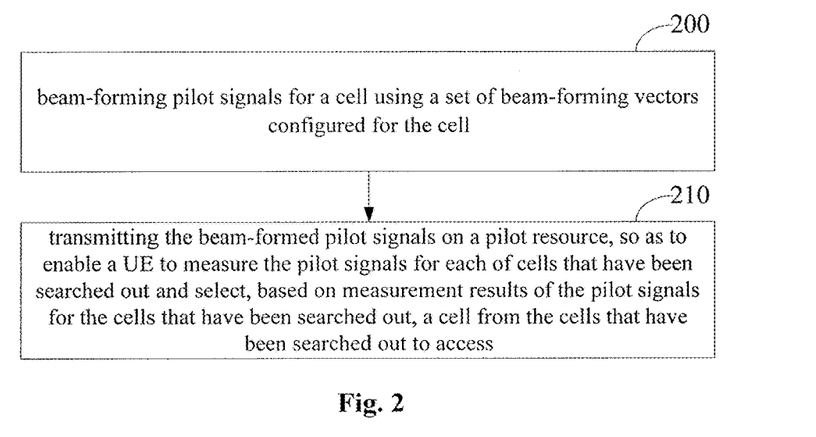
FIG. 2 is a flow chart of a cell access method at a network side according to some embodiments of the present disclosure.

The present disclosure further provides in some embodiments a cell access method at a network side which, as shown in FIG. 2, includes: Step 200 of beam-forming pilot signals for a cell using a set of beam-forming vectors configured for the cell; and Step 210 of transmitting the beam-formed pilot signals on a pilot resource, so as to enable a UE to measure the pilot signals for each of cells that have been searched out and select, based on measurement results of the pilot signals for the cells that have been searched out, a cell from the cells that have been searched out to access.

According to the embodiments of the present disclosure, the pilot signals for each cell may be beam-formed at a network side using a set of beam-forming vectors, so as to transmit beams respectively carrying the pilot signals in various directions. When a UE attempts to access a cell, the UE may measure the beam-formed pilot signals, the closer the beam direction pointing to the UE, the better a measurement result of the pilot signal carried on the beam. Hence, with the cell access method provided in the present disclosure, the cell corresponding to the optimum pilot signal measurement result selected by the UE is just a cell corresponding to a beam having a closest direction pointing to the UE. As a result, compared with the related technologies, it is able to improve an access effect of the UE with the present disclosure, thereby improving the system performance.

In the case that the pilot signal is a CSI-RS or any other pilot signal not detectable in a blind detection manner, the method may further include transmitting configuration information of the pilot resource for the cell.

In the embodiments of the present disclosure, the step of transmitting the configuration information of the pilot resource for the cell may include but not limited to transmitting a broadcast message that carries the configuration information of the pilot resource for the cell.

In addition, the method may further include acquiring configuration information of a pilot resource for a neighboring cell, and the configuration information of the pilot resource for the neighboring cell may also be carried in the broadcast message. For the cells of different access network nodes, the configuration information of the pilot resource for the neighboring cell may be acquired through a communication interface between the different access network nodes. The access network node which is configured to acquire and transmit the configuration information of the pilot resource for the neighboring cell may be predetermined, or specified via a communication protocol, which is not particularly defined herein.

In some embodiments of the present disclosure, the access network node may be a macro base station, e.g., an evolved NodeB (eNB) in an LTE system, or a micro base station, e.g., a Lower Power Node (LPN), a Pico cell, a Femto cell or an Access Point (AP), which is not particularly defined herein.

In the case that the quantity of the pilot resource, the quantity of the pilot resource ports and a configuration period for one cell are identical to those for a neighboring cell of the cell, it is unnecessary for all the cells to transmit the broadcast messages to indicate the configuration information of the pilot resources for the cells. Instead, merely one or a part of the cells may transmit the broadcast message, and the configuration information of the pilot resources for the other cells that have been searched out may be acquired at the UE side based on the received broadcast message and a neighboring relation among the cells. Which cell(s) may send the broadcast message is not particularly defined herein.

In the case that there is a correspondence between ID information of each cell and the configuration information of the pilot signals for each cell, the pilot signals for the cell are beam-formed in accordance with the configuration information of the pilot signals for the cell.

The pilot signals for the cell may be beam-formed in various ways. In a possible embodiment of the present disclosure, the step of beam-forming the pilot signals for the cell using a set of beam-forming vectors configured for the cell may include: beam-forming the pilot signals on different pilot resources for the cell using different beam-forming vectors, where the cell is provided with N pilot resources each having M ports, N is also the quantity of the beam-forming vectors configured for the cell, and each of N and M is an integer not smaller than 1. In another possible embodiment of the present disclosure, the step of beam-forming the pilot signals for the cell using a set of beam-forming vectors configured for the cell may include: beam-forming the pilot signals on different ports of each pilot resource for the cell using different beam-forming vectors, where the cell is provided with at least one N-port pilot resource, N is also the quantity of the beam-forming vectors configured for the cell, and N is an integer not smaller than 1.

The scheme in the embodiments of the present disclosure may be applied to a traditional Multiple-Input Multiple-Output (MIMO) system or a 3D MIMO system.

Figure 3:
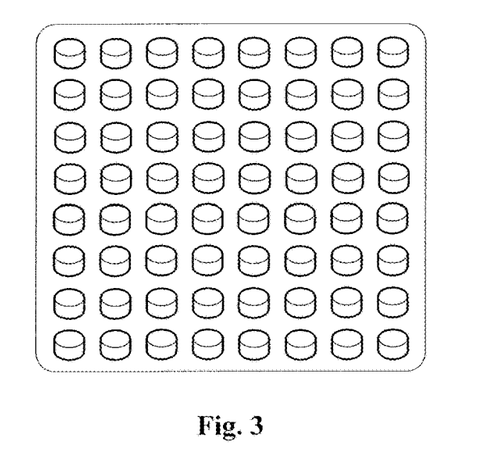
FIG. 3 is a schematic view of an antenna structure for a three-dimensional (3D) Multiple Input Multiple Output (MIMO) system.

For an antenna array in the 3D MIMO system, antennas may be arranged horizontally and vertically, and FIG. 3 shows a single polarization antenna array consisting of 64 antennas, where each cylinder represents one antenna. It should be appreciated that, in the 3D MIMO system, the two-dimensional (2D) antenna array may include, but not limited to, 64 antennas, and it may include 8 antennas, 16 antennas or 32 antennas. In addition, the antenna array may be of dual polarization. The 3D MIMO is also called as Full-Dimension (FD) MIMO.

In the 3D MIMO system, in the case that the antennas in each row of the 2D antenna array are virtualized as one antenna port, the pilot signals may be horizontally beam-formed using the beam-forming vectors, and in the case that the antennas in each column of the 2D antenna array are virtualized as one antenna port, the pilot signals may be vertically beam-formed using the beam-forming vectors. In addition, the beams may be adjusted in a horizontal direction in any other known ways, so as to further improve the system performance by use of gains caused by vertical beam-forming.

Implementation modes for the UE to access a cell will be described hereinafter by taking a scenario where CSI-RSs are vertically beam-formed in the 3D MIMO system as an example.

Based on the scenario where the CSI-RSs are vertically beam-formed in the 3D MIMO system, in a first implementation mode for the UE to access a cell, each cell may be configured with a set of beam-forming vectors, and the beam-forming vectors for different cells may be identical or different. In the case that a set of beam-forming vectors, e.g., $\{V_{i1}, V_{i2}, \ldots V_{iN}\}$, has been defined for a cell i, it is equipment to dividing an angular space in a vertical dimension.

There may exist the following CSI-RS configurations for the cell i.

Figure 4:
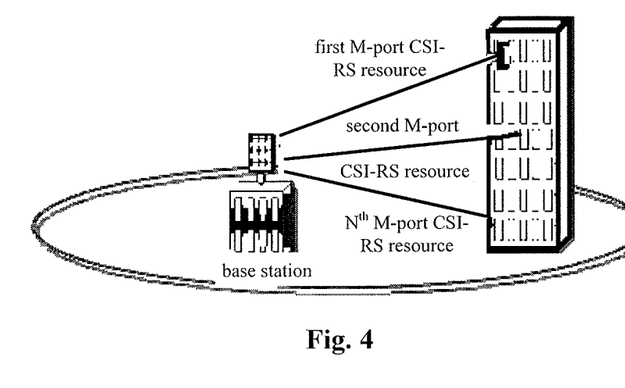
FIG. 4 is a schematic view showing a vertical beam-forming scenario according to some embodiments of the present disclosure.

Configuration 1: N CSI RS resources each having M ports may be configured, where M>1, and the CSI-RS transmitted on each CSI-RS resource may be beam-formed using one beam-forming vector. For example, the CSI-RS transmitted on a $j^{th}$ CSI-RS resource may be beam-formed in a vertical dimension using a beam-forming vector $V_{ij}$, so as to generate several beams in the vertical dimension, as shown in FIG. 4, where j∈[1, N].

Configuration 2: one N-port CSI-RS resource may be configured, and the CSI-RS transmitted on each port of the N-port CSI-RS resource may be beam-formed using one beam-forming vector. For example, a port j of the CSI-RS resource may be beam-formed using a beam-forming vector so as to generate several beams in the vertical dimension, where j∈[1, N].

It should be appreciated that, any other CSI-RS resource configurations may also be used, which are not particularly defined herein. Once the CSI-RS resource configuration is determined, the CSI-RSs may be beam-formed using the beam-forming vectors in a set of beam-forming vectors configured for the cell i.

A base station for the cell i may broadcast, in a system message, the configuration information of a CSI-RS resource for the cell i, and the configuration information includes a time-frequency resource position and a scrambling sequence for the CSI-RS resource.

When the UE attempts to access a cell, the UE needs to acquire CSI-RS configuration information of each cell. At first, the UE may achieve 5-ms slot synchronization based on a PSS, and then achieve frame synchronization and acquire cell IDs based on an SSS. Next, the UE may acquire CRSs for channel estimation, and demodulate system broadcast messages, so as to acquire the CSI-RS configuration information of the cells from the system broadcast messages.

To be specific, the UE may demodulate a Physical Broadcast Channel (PBCH) to acquire the CSI-RS configuration information of the cells. For example, the UE may demodulate the PBCH to acquire information carried in a Master Information Block (MIB); acquire, based on the MIB, information carried in a System Information Block (SIB) transmitted via a Physical Downlink Shared Channel (PDSCH), and then determine, based on the information carried in the SIB, the CSI-RS configuration information of the cells.

After determining the CSI-RS configuration information of a certain cell that has been searched out, the UE may measure CSI-RSs for this cell. In this implementation mode, RSRP values of the CSI-RSs may be measured. All RSRP values measured in a current period may be stored. Because the CSI-RSs are transmitted periodically, the above-mentioned period refers to a transmission period of the CSI-RSs.

Optionally, a maximum RSRP value may be selected as the RSRP value for the cell, which is in accordance with the following equation: $RSRP_{icell}=\max\{RSRP_{i1}, RSRP_{i2}, \ldots, RSRP_{iN}\}$, where $RSRP_{icell}$ represents the RSRP value for the cell i, and $RSRP_{ij}$ represents an RSRP value of a $j^{th}$ CSI-RS measured in the current period.

Upon the acquisition of the RSRP values of the beam-formed CSI-RSs for respective cells that have been searched out, the UE may select one cell from the respective cells based on measurement results of the CSI-RSs for the respective cells, and access the selected cell. In a possible embodiment of the present disclosure, the UE may select a cell corresponding to the maximum RSRP value from all the cells to access.

Based on the scenario where the CSI-RSs are vertically beam-formed in the 3D MIMO system, in a second implementation mode for the UE to access a cell, a beam-forming procedure of the CSI-RSs for each cell, i.e., the CSI-RS configuration of each cell, may refer to that mentioned in the first implementation mode.

Figure 5:
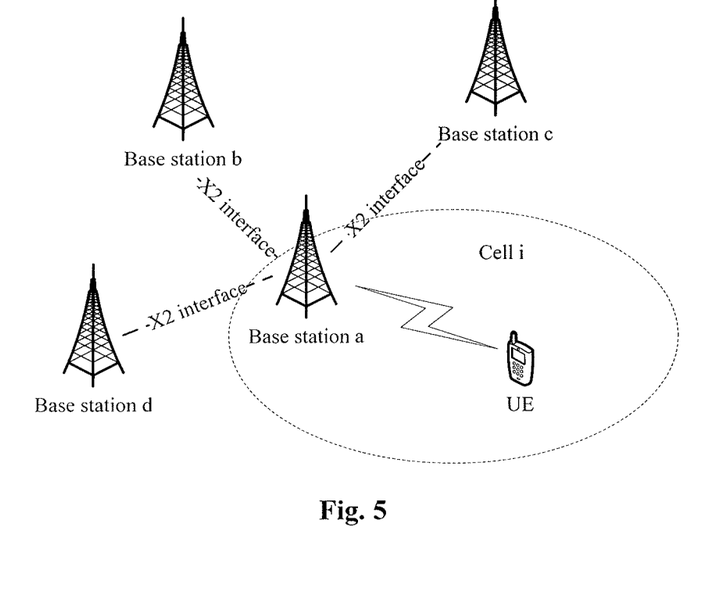
FIG. 5 is a schematic view showing the transmission of Channel State Information Reference Signal (CSI-RS) configuration information for cells between base stations according to some embodiments of the present disclosure.

However, in the second implementation mode, the CSI-RS configuration information of a cell corresponding to a base station may be transmitted to a neighboring base station through an X2 interface between the base station and the neighboring base station. In this regard, the base station may broadcast, in a system broadcast message of the cell i, not only CSI-RS configuration information of the cell i, but also the CSI-RS configuration information of a neighboring cell, as shown in FIG. 5. In FIG. 5, base station b, base station c and base station d are all neighboring base stations of base station a.

When the UE attempts to access a cell, the UE needs to acquire the CSI-RS configuration information of each cell. To be specific, the UE may achieve 5-ms slot synchronization based on a PSS for the cell i, and then achieve frame synchronization and acquire a cell ID of the cell i based on an SSS. Next, the UE may acquire a CRS for channel estimation and demodulating a system broadcast message, so as to acquire the CSI-RS configuration information of respective cells from the system broadcast message.

To be specific, the UE may demodulate a PBCH for the cell i, so as to acquire the CSI-RS configuration information of the respective cells that have been searched out. For example, the UE may demodulate the PBCH for the cell i so as to acquire information carried in an MIB; acquire, based on the MIB, information carried in an SIB transmitted via a PDSCH; and then determine, based on the information carried in the SIB, the CSI-RS configuration information of the respective cells that have been searched out.

The following table shows an example of the CSI-RS configuration information.

| Cell ID | CSI-RS configuration |
| --- | --- |
| ID1 | CSI-RS-Config1, CSI-RS-Config2 |
| ID2 | CSI-RS-Config3, CSI-RS-Config4 |

The configuration information of two cells is given in the table. The configuration information of more than two cells may be set in a similar manner, and thus will not be particularly defined herein. A cell ID of a first cell is ID1, and two pieces of CSI-RS configuration information are provided, i.e., CSI-RS-Config1 and CSI-RS-Config2. CSI-RS-Config1 may include time-frequency configuration information and sequence information for one CSI-RS resource, and CSI-RS-Config2 may include time-frequency configuration information and sequence information for another CSI-RS resource.

For the other cells, the UE merely needs to complete the cell search. Then, the UE may measure the CSI-RSs for the cells that have been searched out based on the CSI-RS configuration information of the cells that have been searched out acquired in the cell i, and select a cell to access based on the measurement results. The implementation procedure may refer to that in the above-mentioned first implementation mode.

Based on the scenario where the CSI-RSs are vertically beam-formed in the 3D MIMO system, in a third implementation mode for the UE to access a cell, it is supposed that the cell i and a neighboring cell of cell i are provided with an identical quantity of CSI-RS resource, an identical quantity of CSI-RS ports and an identical configuration period. A beam-forming procedure of the CSI-RSs for each cell, i.e., the CSI-RS configuration for each cell, may refer to that mentioned in the first implementation mode.

However, in the third implementation mode, merely the CSI-RS configuration information of the cell i broadcast by the cell i is received.

The UE may acquire the CSI-RS configuration information of the cell i in a manner identical to that mentioned in the first implementation mode.

For each neighboring cell of the cell i, the UE needs to complete cell search so as to acquire cell IDs. Then, the UE may search for time-frequency resource positions of the CSI-RSs on all possible time-frequency resources based on the cell IDs, so as to acquire the complete CSI-RS configuration information of each neighboring cell of the cell i. The other steps in the third implementation mode may refer to those mentioned in the second implementation mode.

Based on the scenario where the CSI-RSs are vertically beam-formed in the 3D MIMO system, in a fourth implementation mode for the UE to access a cell, there is a predetermined correspondence (a predetermined mapping relation) between the CSI-RS configuration information and the cell ID.

When the UE attempts to access a cell, the UE may achieve slot synchronization and acquire cell IDs based on a PSS and an SSS in a manner identical to that mentioned hereinbefore. Upon the acquisition of the cell IDs, the UE may determine the CSI-RS configuration information of a cell based on the predetermined mapping relation.

After the CSI-RS configuration information of one cell has been determined, the UE may measure the CSI-RSs for the cell, and may perform cell access based on the measurement result. The implementation procedure may refer to that mentioned in the first implementation mode.

An example of the mapping relation between the cell ID and the CSI-RS configuration information is given as follows.

In the case that there are P available CSI-RS patterns in a system, a pattern index of a CSI-RS for one cell may be calculated using the equation: $R_1=\text{CELL\_ID} \bmod P$, where CELL_ID represents an ID of the cell. In the case that there are N CSI-RS resources in one cell, the pattern indices of multiple CSI-RSs may be acquired through the following equations: $R_1=\text{CELL\_ID} \bmod P$, $R_2=(\text{CELL\_ID}+1) \bmod P$, ..., and $R_N=(\text{CELL\_ID}+N-1) \bmod P$; or $R_1=\text{CELL\_ID} \bmod P$, $R_2=(\text{CELL\_ID}*2) \bmod P$, ..., and $R_N=(\text{CELL\_ID}*N) \bmod P$; where $R_1$, ..., and $R_N$ represent the pattern indices of the CSI-RSs.

In the case that the CSI-RSs are transmitted with a certain period, e.g., Q ms, an offset value (OFFSET) of the CSI-RS resource within one subframe may be calculated based on the cell ID through the following equation: $\text{OFFSET}=\text{CELL\_ID} \bmod Q$.

Figure 6:
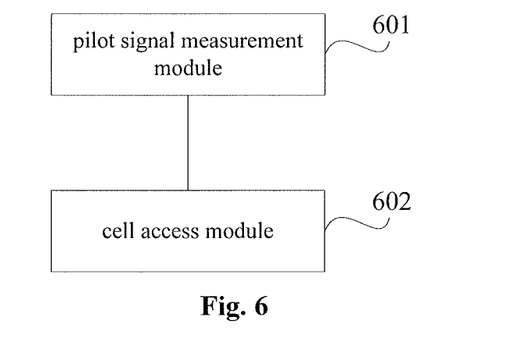
FIG. 6 is a schematic view showing a cell access apparatus according to some embodiments of the present disclosure.

Based on an identical inventive concept, the present disclosure further provides in some embodiments a cell access apparatus which, as shown in FIG. 6, includes: a pilot signal measurement module 601 configured to measure pilot signals for each of multiple cells that have been searched out, the pilot signals transmitted on a pilot resource for each cell being beam-formed using a set of beam-forming vectors configured for the cell; and a cell access module 602 configured to select a cell corresponding to an optimum pilot signal measurement result from the multiple cells that have been searched out and access to the selected cell.

According to the embodiments of the present disclosure, the pilot signals for each cell may be beam-formed at a network side using a set of beam-forming vectors, so as to transmit beams respectively carrying the pilot signals in various directions. When a UE attempts to access a cell, the UE may measure the beam-formed pilot signals, and the closer the beam direction pointing to the UE, the better a measurement result of the pilot signal carried on the beam. Hence, with the cell access apparatus provided in the present disclosure, the cell corresponding to the optimum pilot signal measurement result selected by the UE is just a cell corresponding to a beam having a closest direction pointing to the UE. As a result, compared with the related technologies, it is able to improve an access effect of the UE with the present disclosure, thereby improving the system performance.

In a possible embodiment of the present disclosure, the cell access apparatus further includes a pilot configuration acquisition module configured to acquire configuration information of the pilot resource for each of the cells that have been searched out, and a pilot resource determination module configured to determine the pilot resource where the pilot signals for each of the cells are located based on the acquired configuration information of the pilot resource. The pilot signal measurement module is further configured to measure, on the pilot resource where the pilot signals for each of the cells that have been searched out are located, the pilot signals for each of the cells that have been searched out.

In a possible embodiment of the present disclosure, the pilot configuration acquisition module is further configured to receive a broadcast message sent by each of the cells that have been searched out, the broadcast message sent by each cell carrying the configuration information of the pilot resource for the cell, and to acquire the configuration information of the pilot resource for each cell that has been searched out from the received broadcast message.

In a possible embodiment of the present disclosure, the pilot configuration acquisition module is further configured to: receive a broadcast message of at least one cell that has been searched out, the broadcast message of each cell carrying configuration information of a pilot resource for the cell and configuration information of a pilot resource for a neighboring cell; acquire the configuration information of the pilot resource for the cell whose broadcast message has been received; and acquire configuration information of a pilot resource for a cell that has been searched out and of which no broadcast message has been received based on the configuration information of the pilot resource for the neighboring cell carried in the received broadcast message.

In a possible embodiment of the present disclosure, the pilot configuration acquisition module is further configured to: receive a broadcast message of at least one cell that has been searched out, the broadcast message of each cell carrying the configuration information of a pilot resource for the cell; acquire the configuration information of the pilot resource for the cell whose broadcast message has been received; and determine a neighboring relation between a cell that has been searched out and of which no broadcast message has been received and the cell whose broadcast message has been received, and determine configuration information of a pilot resources for the cell that has been searched out and of which no broadcast message has been received based on the configuration information of the pilot resource for the cell whose broadcast message has been received and the neighboring relation. Neighboring cells have an identical quantity of pilot resource, an identical quantity of pilot resource ports and an identical configuration period.

In a possible embodiment of the present disclosure, the pilot configuration acquisition module is further configured to acquire configuration information of pilot resources for respective cells that have been searched out, based on a correspondence between ID information of each cell and configuration information of the pilot signals for each cell.

In a possible embodiment of the present disclosure, the pilot signals on different pilot resources for an identical cell are beam-formed using different beam-forming vectors, and the cell is provided with N pilot resources each having M ports, where N r is also the quantity of the beam-forming vectors configured for the cell, and each of N and M is an integer not smaller than 1.

In a possible embodiment of the present disclosure, the pilot signals on different ports of each pilot resource for a cell are beam-formed using different beam-forming vectors, and the cell is provided with at least one N-port pilot resource, where N is also the quantity of the beam-forming vectors configured for the cell, and N is an integer not smaller than 1.

Figure 7:
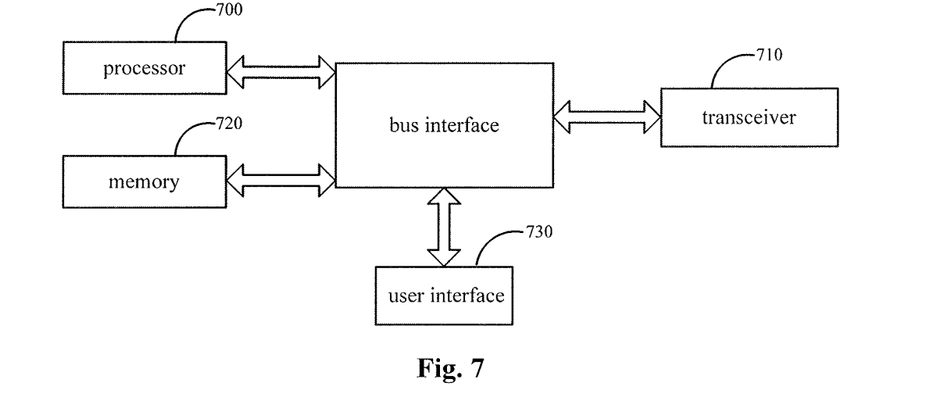
FIG. 7 is a schematic view showing a UE according to some embodiments of the present disclosure.

Based on an identical inventive concept, the present disclosure further provides in some embodiments a UE which, as shown in FIG. 7, includes a processor 700, a memory 720 and a transceiver 710. The processor 700 is configured to read a program stored in the memory 720, so as to: measure, through the transceiver, pilot signals for each of multiple cells that have been searched out, the pilot signal transmitted on a pilot resource for each cell being beam-formed using a set of beam-forming vectors configured for the cell; and select a cell corresponding to an optimum pilot signal measurement result from the multiple cells that have been searched out and access to the selected cell through the transceiver. The transceiver 710 is configured to receive and transmit data under the control of the processor 700.

In FIG. 7, a bus architecture may include a number of buses and bridges connected to each other, so as to connect various circuits of one or more processors 700 and the memory 720. In addition, as is known in the art, the bus architecture may be used to connect any other circuits, such as a circuit for a peripheral device, a circuit for a voltage stabilizer and a power management circuit, which are not particularly defined herein. Bus interfaces are provided, and the transceiver 710 may consist of more than one elements, e.g., i.e., a transmitter and a receiver for communication with any other devices over a transmission medium. With respect to different UEs, a user interface 730 may also be provided for devices which are to be arranged inside or outside the UE, and these devices may include but not limited to a keypad, a display, a speaker, a microphone and a joystick.

The processor 700 may take charge of managing the bus architecture as well general processings. The memory 720 may store data used in operation of the processor 700.

Figure 8:
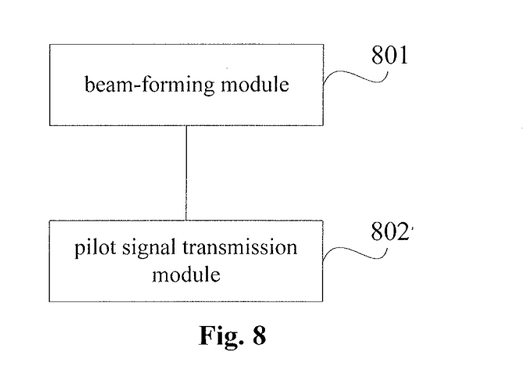
FIG. 8 is a schematic view showing another cell access apparatus according to some embodiments of the present disclosure.

Based on an identical inventive concept, the present disclosure further provides in some embodiments a cell access apparatus which, as shown in FIG. 8, includes: a beam-forming module 801 configured to beam-form pilot signals for a cell using a set of beam-forming vectors configured for the cell; and a pilot signal transmission module 802 configured to transmit the beam-formed pilot signals on a pilot resource, so as to enable a UE to measure the pilot signals for each of cells that have been searched out and select, based on measurement results of the pilot signals for the cells that have been searched out, a cell from the cells that have been searched out to access.

According to the embodiments of the present disclosure, the pilot signals for each cell may be beam-formed at a network side using a set of beam-forming vectors, so as to transmit beams respectively carrying the pilot signals in various directions. When a UE attempts to access a cell, the UE may measure the beam-formed pilot signals, the closer the beam direction pointing to the UE, the better a measurement result of the pilot signal carried on the beam. Hence, with the cell access solution provided in the present disclosure, the cell corresponding to the optimum pilot signal measurement result selected by the UE is just a cell corresponding to a beam having a closest direction pointing to the UE. As a result, compared with the related technologies, it is able to improve an access effect of the UE with the present disclosure, thereby improving the system performance.

In a possible embodiment of the present disclosure, the cell access apparatus further includes a pilot configuration transmission module configured to transmit configuration information of the pilot resource for the cell.

In a possible embodiment of the present disclosure, the pilot configuration transmission module is further configured to transmit a broadcast message, the broadcast message carrying the configuration information of the pilot resource for the cell.

In a possible embodiment of the present disclosure, the broadcast message further carries configuration information of a pilot resource for a neighboring cell.

In a possible embodiment of the present disclosure, the beam-forming module is further configured to beam-form the pilot signals on different pilot resources for the cell using different beam-forming vectors, where the cell is provided with N pilot resources each having M ports, N is also the quantity of the beam-forming vectors configured for the cell, and each of N and M is an integer not smaller than 1.

In a possible embodiment of the present disclosure, the beam-forming module is further configured to beam-form the pilot signals on different ports of each pilot resource for the cell using different beam-forming vectors, where the cell is provided with at least one N-port pilot resource, N is also the quantity of the beam-forming vectors configured for the cell, and N is an integer not smaller than 1.

Figure 9:
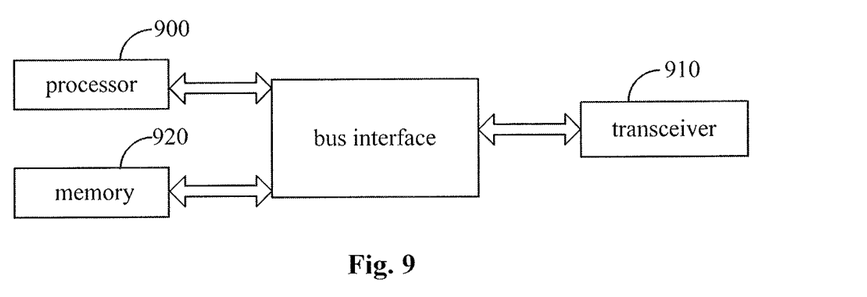
FIG. 9 is a schematic view showing a base station according to some embodiments of the present disclosure.

Based on an identical inventive concept, the present disclosure further provides in some embodiments a base station which, as shown in FIG. 9, includes a processor 900, a memory 920 and a transceiver 910. The processor 900 is configured to read a program stored in the memory 920, so as to: beam-form pilot signals for a cell using a set of beam-forming vectors configured for the cell; and transmit the beam-formed pilot signals on a pilot resource through the transceiver, so as to enable a UE to measure the pilot signals for each of cells that have been searched out and select, based on measurement results of the pilot signals for the cells that have been searched out, a cell from the cells that have been searched out to access. The transceiver 910 is configured to receive and transmit data under the control of the processor 900.

In FIG. 9, a bus architecture may include a number of buses and bridges connected to each other, so as to connect various circuits of one or more processors 900 and the memory 920. In addition, as is known in the art, the bus architecture may be used to connect any other circuits, such as a circuit for a peripheral device, a circuit for a voltage stabilizer and a power management circuit. Bus interfaces are provided, and the transceiver 910 may consist of multiple elements, i.e., a transmitter and a receiver for communication with any other devices over a transmission medium. The processor 900 may take charge of managing the bus architecture as well general processings. The memory 920 may store data used in operation of the processor 900.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A cell access method, comprising:
acquiring configuration information of the pilot resource for each of the plurality of cells that has been searched out;
determining the pilot resource where the pilot signals for each of the plurality of cells are located, based on the acquired configuration information of the pilot resource;
measuring, on the pilot resource where the pilot signals for each of the plurality of cells that has been searched out are located, the pilot signals for each of the plurality of cells that has been searched out, the pilot signals transmitted on a pilot resource for each cell being beam-formed using a set of beam-forming vectors configured for the cell; and
selecting a cell corresponding to an optimum pilot signal measurement result from the plurality of cells that has been searched out and accessing the selected cell,
wherein the acquiring the configuration information of the pilot resource for each of the plurality of cells that has been searched out comprises:
receiving a broadcast message sent by each of the plurality of cells that has been searched out, the broadcast message sent by each cell carrying the configuration information of the pilot resource for the cell, acquiring the configuration information of the pilot resource for each of the plurality of cells that has been searched out from the received broadcast message; or
receiving a broadcast message of at least one cell that has been searched out, the broadcast message of each cell carrying the configuration information of the pilot resource for the cell and the configuration information of the pilot resource for a neighboring cell, acquiring the configuration information of the pilot resource for the cell of which the broadcast message has been received, and acquiring the configuration information of the pilot resource for a cell that has been searched out and of which no broadcast message has been received, based on the configuration information of the pilot resource for the neighboring cell carried in the received broadcast message; or
receiving a broadcast message of at least one cell that has been searched out, the broadcast message from each cell carrying the configuration information of the pilot resource for the cell, acquiring the configuration information of the pilot resource for the cell of which the broadcast message has been received, and determining a neighboring relation between a cell that has been searched out and of which no broadcast message has been received and the cell of which the broadcast message has been received, and determining the configuration information of the pilot resource for the cell that has been searched out and of which no broadcast message has been received, based on the configuration information of the pilot resource for the cell of which the broadcast message has been received and the neighboring relation, wherein neighboring cells have an identical quantity of the pilot resource, an identity quantity of pilot resource ports and an identical configuration period; or acquiring the configuration information of the pilot resource for each of the plurality of cells that has been searched out, based on a correspondence between identity information of each cell and configuration information of the pilot signals for each cell.

2. The cell access method according to claim 1, wherein the pilot signals on different pilot resources for an identical cell are beam-formed using different beam-forming vectors, the cell is provided with N pilot resources each having M ports, where N equals to the quantity of the beam-forming vectors configured for the cell, and each of N and M is an integer not smaller than 1.

3. The cell access method according to claim 1, wherein the pilot signals on different ports of each pilot resource for a cell are beam-formed using different beam-forming vectors, the cell is provided with at least one N-port pilot resource, where N equals to the quantity of the beam-forming vectors configured for the cell, and N is an integer not smaller than 1.

4. A cell access method, comprising:
beam-forming pilot signals for a cell using a set of beam-forming vectors configured for the cell; and
transmitting the beam-formed pilot signals on a pilot resource, to enable a User Equipment to realize the following operations: acquiring configuration information of the pilot resource for each of the plurality of cells that has been searched out; determining the pilot resource where the pilot signals for each of the plurality of cells are located, based on the acquired configuration information of the pilot resource: measuring, on the pilot resource where the pilot signals for each of the plurality of cells that has been searched out are located, the pilot signals for each of the plurality of cells that has been searched out, the pilot signals transmitted on a pilot resource for each cell being beam-formed using a set of beam-forming vectors configured for the cell and selecting a cell corresponding, to an optimum pilot signal measurement result from the plurality of cells that has been searched out and accessing the selected cell,
wherein the acquiring the configuration information of the pilot resource for each of the plurality of cells that has been searched out comprises:
receiving a broadcast message sent by each of the plurality of cells that has been searched out, the broadcast message sent by each cell carrying the configuration information of the pilot resource for the cell, acquiring the configuration information of the pilot resource for each of the plurality of cells that has been searched out from the received broadcast message; or
receiving a broadcast message of at least one cell that has been searched out, the broadcast message of each cell carrying the configuration information of the pilot resource for the cell and the configuration information of the pilot resource for a neighboring cell, acquiring the configuration information of the pilot resource for the cell of which the broadcast message has been received, and acquiring the configuration information of the pilot resource for a cell that has been searched out and of which no broadcast message has been received, based on the configuration information of the pilot resource for the neighboring cell carried in the received broadcast message; or receiving a broadcast message of at least one cell that has been searched out, the broadcast message from each cell carrying the configuration information of the pilot resource for the cell, acquiring the configuration information of the pilot resource for the cell of which the broadcast message has been received, and determining a neighboring relation between a cell that has been searched out and of which no broadcast message has been received and the cell of which the broadcast message has been received, and determining the configuration information of the pilot resource for the cell that has been searched out and of which no broadcast message has been received, based on the configuration information of the pilot resource for the cell of which the broadcast message has been received and the neighboring relation, wherein neighboring cells have an identical quantity of the pilot resource, an identity quantity of pilot resource ports and an identical configuration period; or acquiring the configuration information of the pilot resource for each of the plurality of cells that has been searched out, based on a correspondence between identity information of each cell and configuration information of the pilot signals for each cell.

5. The cell access method according to claim 4, further comprising transmitting configuration information of the pilot resource for the cell.

6. The cell access method according to claim 5, wherein the transmitting the configuration information of the pilot resource for the cell comprises: transmitting a broadcast message that carries the configuration information of the pilot resource for the cell.

7. The cell access method according to claim 6, wherein the broadcast message further carries configuration information of a pilot resource for a neighboring cell.

8. The cell access method according to claim 4, wherein the beam-forming the pilot signals for the cell using the set of beam-forming vectors configured for the cell comprises: beam-forming the pilot signals on different pilot resources for the cell using different beam-forming vectors, wherein the cell is provided with N pilot resources each having M ports, where N equals to the quantity of the beam-forming vectors configured for the cell, and each of N and M is an integer not smaller than 1.

9. The cell access method according to claim 4, wherein the beam-forming the pilot signals for the cell using the set of beam-forming vectors configured for the cell comprises: beam-forming the pilot signals on different ports of each pilot resource for the cell using different beam-forming vectors, wherein the cell is provided with at least one N-port pilot resource, where N equals to the quantity of the beam-forming vectors configured for the cell, and N is an integer not smaller than 1.

10. A cell access apparatus, comprising:
a processor; and
a memory connected to the processor via a bus interface and configured to store therein a program and data to be used in operation of the processor,
wherein when calling an executing the program and data stored in the memory, the processor is configured for:
acquiring configuration information of the pilot resource for each of the plurality of cells that has been searched out;
determining the pilot resource where the pilot signals for each of the plurality of cells are located, based on the acquired configuration information of the pilot resource;

measuring, on the pilot resource where the pilot signals for each of the plurality of cells that has been searched out are located, the pilot signals for each of the plurality of cells that has been searched out, the pilot signals transmitted on a pilot resource for each cell being beam-formed using a set of beam-forming vectors configured for the cell; and selecting a cell corresponding to an optimum pilot signal measurement result from the plurality of cells that has been searched and access the selected cell, wherein the acquiring the configuration information of the pilot resource for each of the plurality of cells that has been searched out comprises:

receiving a broadcast message sent by each of the plurality of cells that has been searched Gut, the broadcast message sent by each cell carrying the configuration information of the pilot resource for the cell, acquiring the configuration information of the pilot resource for each of the plurality of cells that has been searched out from the received broadcast message; or receiving a broadcast message of at least one cell that has been searched out, the broadcast message of each cell carrying the configuration information of the pilot resource for the cell and the configuration information of the pilot resource for a neighboring cell, acquiring the configuration information of the pilot resource for the cell of which the broadcast message has been received and acquiring the configuration information of the pilot resource for a cell that has been searched out and of which no broadcast message has been received, based on the configuration information of the pilot resource for the neighboring cell carried in the received broadcast message; or receiving a broadcast message of at least one cell that has been searched out, the broadcast message from each cell carrying the configuration information of the pilot resource for the cell, acquiring the configuration information of the pilot resource for the cell of which the broadcast message has been received, and determining a neighboring relation between a cell that has been searched out and of which no broadcast message has been received and the cell of which the broadcast message has been received, and determining the configuration information of the pilot resource for the cell that has been searched out and of which no broadcast message has been received, based on the configuration information of the pilot resource for the cell of which the broadcast message has been received and the neighboring relation, wherein neighboring, cells have an identical quantity of the pilot resource, an identity quantity of pilot resource ports and an identical configuration period; or acquiring the configuration information of the pilot resource for each of the plurality of cells that has been searched out, based on a correspondence between identity information of each cell and configuration information of the pilot signals for each cell.

11. The cell access apparatus according to claim 10, wherein the pilot signals on different pilot resources for an identical cell are beam-formed using different beam-forming vectors, the cell is provided with N pilot resources each having M ports, where N equals to the quantity of the beam-forming vectors configured for the cell, and each of N and M is an integer not smaller than 1; or the pilot signals on different ports of each pilot resource for a cell are beam-formed using different beam-forming vectors, the cell is provided with at least one N-port pilot resource, where N equals to the quantity of the beam-forming vectors configured for the cell, and N is an integer not smaller than 1.

12. A cell access apparatus, comprising:
a processor; and
a memory connected to the processor via a bus interface and configured to store therein a program and data to be used in operation of the processor, wherein when calling and executing the program and data stored in the memory, the processor is configured to:

beam-form pilot signals for a cell using a set of beam-forming vectors configured for the cell; and transmit the beam-formed pilot signals on a pilot resource, to enable a User Equipment to realize the following operations: acquiring configuration information of the pilot resource for each of the plurality of cells that has been searched out; determining the pilot resource where the pilot signals for each of the plurality of cells are located, based on the acquired configuration information of the pilot resource; measuring, on the pilot resource where the pilot signals for each of the plurality of cells that been searched out are located, the pilot signals for each of the plurality of cells that has been searched out, the pilot signals transmitted on a pilot resource for each cell being beam-formed using a set of beam-forming, vectors configured for the cell; and selecting a cell corresponding to an optimum pilot signal measurement result from the plurality of cells that has been searched out and accessing the selected cell, wherein the acquiring the configuration information of the pilot resource for each of the plurality of cells that has been searched out comprises:

receiving a broadcast message sent by each of the plurality of cells that has been searched out, the broadcast message sent by each cell carrying the configuration information of the pilot resource for the cell, acquiring the configuration information of the pilot resource for each of the plurality of cells, that has been searched out from the received broadcast message; or receiving a broadcast message of at least one cell that has been searched out, the broadcast message of each cell carrying the configuration information of the pilot resource for the cell and the configuration information of the pilot resource for a neighboring cell, acquiring the configuration information of the pilot resource for the cell of which the broadcast message has been received, and acquiring the configuration information of the pilot resource for a cell that has been searched out and of which no broadcast message has been received, based on the configuration information of the pilot resource for the neighboring cell carried in the received broadcast message; or receiving a broadcast message of at least one cell that has been searched out, the broadcast message from each cell carrying the configuration information of the pilot resource for the cell, acquiring the configuration information of the pilot resource for the cell of which the broadcast message has been received, and determining a neighboring relation between a cell that has been searched out and of which no broadcast message has been received and the cell of which the broadcast message has been received, and determining the configuration information of the pilot resource for the cell that has been searched out and of which no broadcast message has been received, based on the configuration information of the pilot resource for the cell of which the broadcast message has been received and the neighboring relation, wherein neighboring cells have an identical quantity of the pilot resource, an identity quantity of pilot resource ports and an identical configuration period; or acquiring tyre configuration information of the pilot resource for each of the plurality of cells that has been searched out, based on a correspondence between identity information of each cell and configuration information of the pilot signals for each cell.

13. The cell access apparatus according to claim 12, wherein when calling and executing the program and data stored in the memory, the processor is configured to: transmit configuration information of the pilot resource for the cell.

14. The cell access apparatus according to claim 12, wherein when calling and executing the program and data stored in the memory, the processor is configured to: beam-form the pilot signals on different pilot resources for the cell using different beam-forming vectors, and the cell is provided with N pilot resources each having M ports, where N equals to the quantity of the beam-forming vectors configured for the cell, and each of N and M is an integer not smaller than 1; or when calling and executing the program and data stored in the memory, the processor is configured to: beam-form the pilot signals on different ports of each pilot resource for the cell using different beam-forming vectors, and the cell is provided with at least one N-port pilot resource, where N equals to the quantity of the beam-forming vectors configured for the cell, and N is an integer not smaller than 1.

* * * * *